US008901477B2

(12) United States Patent
Shiota et al.

(10) Patent No.: US 8,901,477 B2
(45) Date of Patent: Dec. 2, 2014

(54) ELECTROMAGNETIC WAVE DETECTION DEVICE

(75) Inventors: Kazunori Shiota, Miyagi (JP); Akiyoshi Irisawa, Miyagi (JP)

(73) Assignee: Advantest Corporation, Tokyo (JP)

(*) Notice: Subject to any disclaimer, the term of this patent is extended or adjusted under 35 U.S.C. 154(b) by 324 days.

(21) Appl. No.: 13/614,431

(22) Filed: Sep. 13, 2012

(65) Prior Publication Data

US 2013/0075597 A1    Mar. 28, 2013

(30) Foreign Application Priority Data

Sep. 28, 2011    (JP) .................. 2011-212906

(51) Int. Cl.
| | | |
|---|---|---|
| *G01J 1/04* | (2006.01) | |
| *G01J 1/42* | (2006.01) | |
| *G01J 5/08* | (2006.01) | |
| *G02F 1/35* | (2006.01) | |
| *G01J 9/02* | (2006.01) | |
| *G01J 9/04* | (2006.01) | |
| *G01J 11/00* | (2006.01) | |
| *G02B 6/34* | (2006.01) | |

(52) U.S. Cl.
CPC ............ *G02F 1/3534* (2013.01); *G02F 1/3544* (2013.01); *G01J 9/02* (2013.01); *G01J 9/04* (2013.01); *G01J 11/00* (2013.01); *G02B 6/34* (2013.01)
USPC .............. 250/227.11; 250/227.18; 250/351; 359/326

(58) Field of Classification Search
USPC ............. 250/504 R, 351, 227.18, 227.11; 359/326
See application file for complete search history.

(56) References Cited

U.S. PATENT DOCUMENTS

| | | | |
|---|---|---|---|
| 2010/0054296 A1* | 3/2010 | Ohtake et al. ............... | 372/80 |
| 2011/0032600 A1* | 2/2011 | Kondo et al. ............... | 359/330 |
| 2013/0284929 A1 | 10/2013 | Ouchi | |

OTHER PUBLICATIONS

Han et al., "Use of the organic crystal DAST for terahertz beam applications", Optics letters, May 1, 2000, pp. 675-677.
Horita et al., "Efficient electro-optic sampling detection of THz wave with Cherenkov-type phase matching" 2010, pp. P-3.
Tani et al., "Detection Technique for detecting Terahertz Pulse Waves with using Electro-Optic Cryatal", Optronics, Aug. 10, 2011, vol. 30, No. 8. pp. 93-96 (Japanese).
ISR International App. No. PCT/JP2012/067031 (Japanese).

* cited by examiner

*Primary Examiner* — Francis M Legasse, Jr.
(74) *Attorney, Agent, or Firm* — Greenblum & Bernstein, P.L.C.

(57) ABSTRACT

According to the present invention, an electromagnetic wave detection device includes an optical waveguide, an electromagnetic wave input unit, and a phase difference measurement unit. According to the thus constructed electromagnetic wave detection device, an optical waveguide is a nonlinear crystal, and includes a branching portion for receiving a probe light pulse, and causing the probe light pulse to branch into two beams of branching light, and two branching light transmission portions for receiving the branching light from the branching portion, and transmitting the branching light. An electromagnetic wave input unit inputs an electromagnetic wave having a frequency equal to or more than 0.01 [THz] and equal to or less than 100 [THz] tilted by an angle generating Cherenkov phase matching with respect to a travel direction of the branching light into one of the two branching light transmission portions.

15 Claims, 7 Drawing Sheets

(a)

(b)

(a)

(b)

(a)

(b)

(a)

(b)

(a)

(b)

ELECTROMAGNETIC WAVE DETECTION DEVICE

BACKGROUND ART

1. Technical Field of the Invention

The present invention relates to detection of an electromagnetic wave (frequency thereof is equal to or more than 0.01 [THz], and equal to or less than 100 [THz]) (such as a terahertz wave (frequency thereof is equal to or more than 0.03 [THz], and equal to or less than 10 [THz]), for example).

2. Related Art

As a method for detecting a temporal waveform of a terahertz wave pulse, there is an EO (electro-optic) sampling method using electro-optic crystal (refer to a Non-patent Document 1 and a Non-patent Document 2).

According to the EO sampling method described in the Non-patent Document 1, probe pulse light and a terahertz wave to be measured are collinearly (coaxially) made incident to the electro-optic crystal. The incident probe pulse light generates a phase difference between an a axis and a b axis due to an electro-optic effect by an electric field of the terahertz wave, and the terahertz wave is detected by detecting the phase difference.

According to the EO sampling method described in the Non-patent Document 2, a terahertz wave is made incident to the electro-optic crystal at an angle $\theta$ ($0<\theta<90°$) with respect to probe pulse light. Cherenkov phase matching is generated in the electro-optic crystal, and an electro-optic effect by an electric field of the terahertz wave generates a phase difference between the a axis and the b axis in the incident probe pulse light. The terahertz wave is detected by detecting this phase difference.

According to the EO sampling methods according to prior art described above, influence of a large birefringence of the electro-optic crystal is not negligible. The probe pulse light extracted from the electro-optic crystal is transmitted through a quarter-wavelength plate, is reflected by a mirror, is again transmitted through the quarter-wavelength plate, and is returned to the electro-optic crystal, thereby cancelling the influence of the large birefringence of the electro-optic crystal.

(Non-patent Document 1)
"Use of the organic crystal DAST for terahertz beam applications", P. Y. Hans et. al., (May 1, 2000/Vol. 25, No. 9/OPTICS LETTERS)

(Non-patent Document 2)
"Efficient electro-optic sampling detection of THz wave with Cherenkov-type phase matching," Kazuki Horita, Tetsuya Kinoshita, Christopher T. Que, Michael Bakunov, Kohji Yamamoto, and Masahiko Tani, International Symposium on Frontier of Terahertz Spectroscopy IV:, Innovations in THz Spectroscopy and THz-Wave Wireless Communications Japan, Poster paper P-3 (Oct. 20th-23rd, 2010, Matsumoto Campus, Shinshu University, Matsumoto, Japan)

SUMMARY OF THE INVENTION

However, it is necessary to arrange the quarter-wavelength plate and the mirror in order to cancel the influence of the large birefringence of the electro-optic crystal, and the configuration of the detection device for the terahertz wave pulse becomes complex.

It is therefore an object of the present invention to simplify a configuration of a detection device for a terahertz wave by means of the EO (electro-optic) sampling method using an electro-optic crystal.

According to the present invention, an electromagnetic wave detection device includes: an optical waveguide that is a nonlinear crystal, and includes a branching portion for receiving a probe light pulse, and causing the probe light pulse to branch into two beams of branching light, and two branching light transmission portions for receiving the branching light from the branching portion, and transmitting the branching light; an electromagnetic wave input unit that inputs an electromagnetic wave having a frequency equal to or more than 0.01 [THz] and equal to or less than 100 [THz] tilted by an angle generating Cherenkov phase matching with respect to a travel direction of the branching light into one of the two branching light transmission portions; and a phase difference measurement unit that measures a phase difference between the two beams of the branching light that have transmitted through the two branching light transmission portions.

According to the thus constructed electromagnetic wave detection device, an optical waveguide is a nonlinear crystal, and includes a branching portion for receiving a probe light pulse, and causing the probe light pulse to branch into two beams of branching light, and two branching light transmission portions for receiving the branching light from the branching portion, and transmitting the branching light. An electromagnetic wave input unit inputs an electromagnetic wave having a frequency equal to or more than 0.01 [THz] and equal to or less than 100 [THz] tilted by an angle generating Cherenkov phase matching with respect to a travel direction of the branching light into one of the two branching light transmission portions. A phase difference measurement unit measures a phase difference between the two beams of the branching light that have transmitted through the two branching light transmission portions.

According to the electromagnetic wave detection device of the present invention, the optical wave guide may include a merging portion for receiving the two beams of branching light from the two branching light transmission portions, and merging the two beams of the branching light; and the phase difference measurement unit may measure a light intensity of an output of the merging portion.

According to the electromagnetic wave detection device of the present invention, the optical waveguide may include a coupler for receiving and coupling the two beams of the branching light from the two branching light transmission portions, causing the coupled light to branch into two beams of output light, and outputting the two beams of the output light; and the phase difference measurement unit may measure light intensities of the two beams of the output light.

According to the electromagnetic wave detection device of the present invention, the coupler may be a directional coupler or an MMI coupler.

According to the electromagnetic wave detection device of the present invention, the branching portion may be a two-input, two-output type directional coupler.

According to the electromagnetic wave detection device of the present invention, the electromagnetic wave input unit may include an electromagnetic wave input surface for receiving the electromagnetic wave, and an electromagnetic wave transmission surface through which the electromagnetic wave which has entered from the electromagnetic wave input surface transmits; and the electromagnetic wave input surface may be tilted with respect to the electromagnetic wave transmission surface.

According to the electromagnetic wave detection device of the present invention, the electromagnetic wave transmission surface may cover one of the branching light transmission portions, and may not cover the other one of the branching light transmission portions.

According to the electromagnetic wave detection device of the present invention, the electromagnetic wave transmission surface may cover the two branching light transmission portions, and may have an electromagnetic wave shield layer which does not transmit the electromagnetic wave between the electromagnetic wave transmission surface and the other branching light transmission portion.

According to the electromagnetic wave detection device of the present invention, the electromagnetic wave transmission surface may cover the two branching light transmission portions, and has an electromagnetic wave shield layer which does not transmit the electromagnetic wave at a portion of the electromagnetic wave input surface covering the other branching light transmission portion.

According to the electromagnetic wave detection device of the present invention, a DC voltage may be impressed upon either one of the two branching light transmission portions.

According to the electromagnetic wave detection device of the present invention, the probe light pulse and the electromagnetic wave may be TE polarized light.

According to the present invention, an electromagnetic wave detection device includes: a first optical waveguide that is a nonlinear crystal, and receives a probe light pulse on one end; a second optical waveguide that is a nonlinear crystal, and does not receive light on one end; an electromagnetic wave input unit that inputs an electromagnetic wave having a frequency equal to or more than 0.01 [THz] and equal to or less than 100 [THz] tilted by an angle generating Cherenkov phase matching with respect to a travel direction of light passing through a close portion at which the first optical waveguide and the second optical waveguide are close to each other into the close portion; and a branch ratio measurement unit that measures a ratio between a light intensity of light output from the other end of the first waveguide and a light intensity of light output from the other end of the second waveguide, wherein the light passing through the first optical waveguide and the light passing through the second optical waveguide are mode-coupled in the close portion.

According to the thus constructed an electromagnetic wave detection device, a first optical waveguide is a nonlinear crystal, and receives a probe light pulse on one end. A second optical waveguide is a nonlinear crystal, and does not receive light on one end. An electromagnetic wave input unit inputs an electromagnetic wave having a frequency equal to or more than 0.01 [THz] and equal to or less than 100 [THz] tilted by an angle generating Cherenkov phase matching with respect to a travel direction of light passing through a close portion at which the first optical wave guide and the second optical waveguide are close to each other into the close portion. A branch ratio measurement unit measures a ratio between a light intensity of light output from the other end of the first waveguide and a light intensity of light output from the other end of the second waveguide. The light passing through the first optical waveguide and the light passing through the second optical waveguide are mode-coupled in the close portion.

According to the electromagnetic wave detection device of the present invention, the electromagnetic wave input unit may include an electromagnetic wave input surface for receiving the electromagnetic wave, and an electromagnetic wave transmission surface through which the electromagnetic wave which has entered from the electromagnetic wave input surface transmits; and the electromagnetic wave input surface may be tilted with respect to the electromagnetic wave transmission surface.

According to the electromagnetic wave detection device of the present invention, the electromagnetic wave transmission surface may cover both the first optical waveguide and the second optical waveguide.

According to the electromagnetic wave detection device of the present invention, the probe light pulse and the electromagnetic wave may be TE polarized light.

PREFERRED EMBODIMENTS

A description will now be given of an embodiment of the present invention referring to drawings.

First Embodiment

Figure 1:
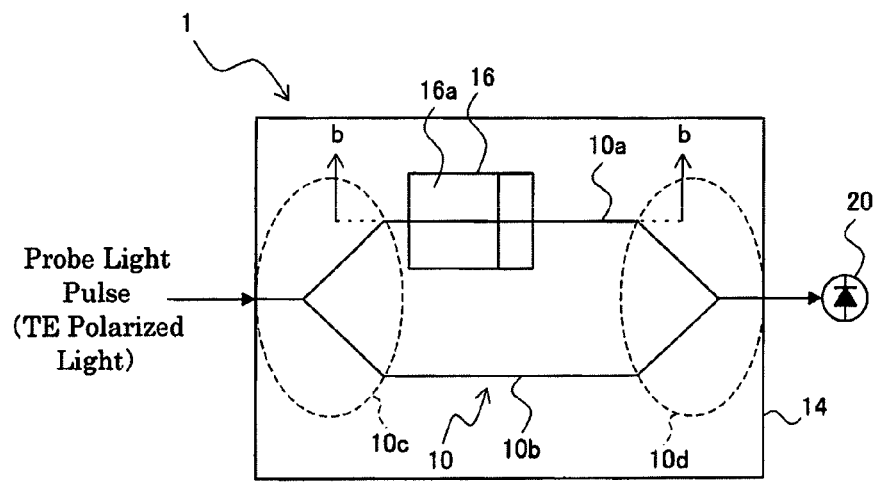
FIG. 1 includes a plan view of an electromagnetic wave detection device 1 according to a first embodiment of the present invention (FIG. 1(a)), and a cross sectional view of a prism 16, an arm 10a, and a substrate 14 made on the arm 10a (cross section made on a plane indicated by b) (FIG. 1(b))
Figure 1:
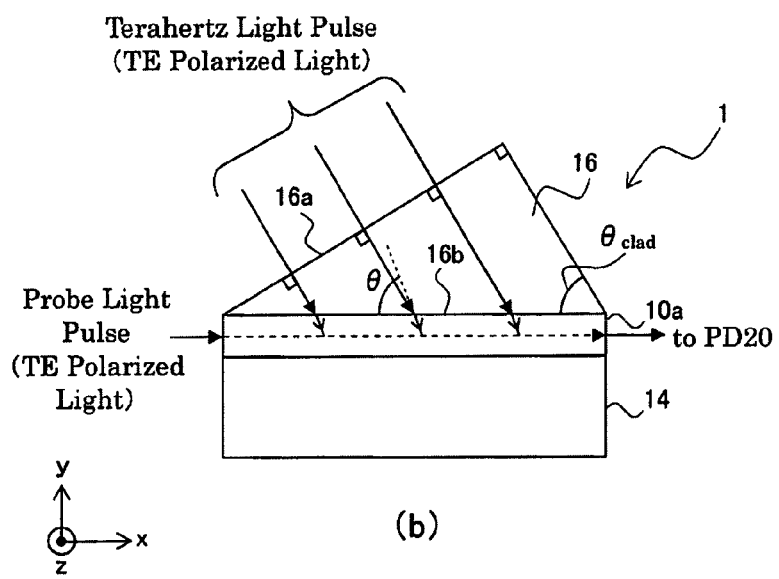

FIG. 1 includes a plan view of an electromagnetic wave detection device 1 according to a first embodiment of the present invention (FIG. 1(a)), and a cross sectional view of a prism 16, an arm 10a, and a substrate 14 made on the arm 10a (cross section made on a plane indicated by b) (FIG. 1(b)). It should be noted that portions of the arm 10a and the substrate 14 which are not directly below the prism 16 are not shown in FIG. 1(b).

The electromagnetic wave detection device 1 according to the first embodiment includes an optical waveguide 10, a substrate 14, a prism (electromagnetic wave input unit) 16, and a PD (Photo Detector) (phase difference measurement unit) 20.

The electromagnetic wave detection device 1 detects an electromagnetic wave having a frequency equal to or more than 0.01 [THz] and equal to or less than 100 [THz]. The electromagnetic wave detected by the electromagnetic wave detection device 1 is an electromagnetic wave (terahertz wave) in the terahertz waveband (equal to or more than 0.03 [THz] and equal to or less than 10 [THz]), for example. It is assumed that the electromagnetic waves detected by the electromagnetic wave detection device 1 are terahertz waves in the embodiments of the present invention.

The substrate 14 is a non-doped LiNbO$_3$ (LN) substrate or an MgO-doped LN substrate, for example. The optical waveguide 10 is disposed on the substrate 14. The substrate 14 and the optical waveguide 10 form a Mach-Zehnder type modulator, and the probe light pulse transmits through the optical waveguide 10.

For example, the substrate 14 is a Y-cut LN, and the transmission direction of the probe light pulse in the optical waveguide 10 is set to an x axis. In this way, the probe light pulse polarized in the z-axis direction (TE polarized light) is input. Then, the r33, which presents the maximum electro-optic coefficient in the LN, can be used, a large electro-optic effect is acquired, and sensitive terahertz wave detection is enabled. For the directions of the x axis, the y axis, and the z axis, refer to FIG. 1(b).

The optical waveguide 10 includes a branching portion 10c, arms (branching light transmission portions) 10a and 10b, and a merging portion 10d. It should be noted that the optical waveguide 10 is a nonlinear crystal.

The branching portion 10c receives the probe light pulse (TE polarized light), and causes the probe light pulse to branch into two beams of branching light. The two beams of the branching light are respectively fed to the arm 10a and the arm 10b. The arms (branching light transmission portions) 10a and 10b receive and transmit the branching light from the branching portion 10c. The merging portion 10d receives and merges the two beams of the branching light from the two arms 10a and 10b.

If the terahertz waves are not fed to the electromagnetic wave detection device 1, an optical path length for the probe light pulse transmitting through the arm 10a and an optical path length for the probe light pulse transmitting through the arm 10b are the same.

The prism (an electromagnetic wave input unit) 16 inputs terahertz waves tilted by an angle θ generating Cherenkov phase matching with respect to the travel direction of the branching light (x direction) into one (arm 10a) of the two arms 10a and 10b. It should be noted that the angle θ is an angle satisfying the following equation.

$$\cos\theta \approx \frac{n_{opt\_eff}}{n_{THz}}$$

where an effective refractive index of the arm 10a at the wavelength of the probe light pulse is $n_{opt\_eff}$, and an refractive index of the arm 10a at the wavelength of the terahertz wave is nmz. For example, if $n_{opt\_eff}$=2.2 and $n_{Thz}$=5.2, θ=66°.

The prism 16 includes an electromagnetic wave input surface 16a and an electromagnetic wave transmission surface 16b. The electromagnetic wave input surface 16a receives the terahertz waves. The electromagnetic wave transmission surface 16b is a surface through which the terahertz waves which have entered from the electromagnetic wave input surface 16a transmit. The electromagnetic wave input surface 16a is tilted with respective to the electromagnetic wave transmission surface 16b. The angle of the tilt of the electromagnetic wave input surface 16a with respect to the electromagnetic wave transmission surface 16b is an angle (90°−θ$_{clad}$). The terahertz waves fed to the prism 16 are pulses of TE polarized light, and are also referred to as terahertz light pulses (refer to FIG. 1(b)).

It should be noted that the angle θ$_{clad}$ is an angle satisfying the following equation.

$$\cos\theta_{clad} \approx \frac{n_{opt\_eff}}{n_{clad}}$$

where n$_{clad}$ is a refractive index of the prism 16 at the wavelength of the terahertz wave. For example, if $n_{opt\_eff}$=2.2 and $n_{clad}$=3.4, θ$_{clad}$=50°.

Moreover, the prism 16 is disposed immediately above the arm 10a, and is not disposed above the arm 10b. As a result, the electromagnetic wave transmission surface 16b covers the one branching light transmission portion (arm 10a), and does not cover the other branching light transmission portion (arm 10b).

Absorption of the terahertz waves is preferably small in order to reduce a transmission loss of the terahertz waves in the prism 16. A material of the prism 16 is thus high-resistivity silicone or germanium, for example.

The PD (Photo Detector) (phase difference measurement unit) 20 measures a phase difference between the two beams of the branching light (probe light pulses) which have transmitted through the two branching light transmission portions (arms 10a and 10b). Specifically, the PD 20 measures a light intensity of an output of the merging portion 10d. The light intensity of the output of the merging portion 10d changes according to the phase difference between the two beams of the branching light, and the phase difference between the two beams of the branching light can be measured by measuring the light intensity of the output of the merging portion 10d.

A description will now be given of an operation of the first embodiment of the present invention.

First, when the probe light pulse is fed to the branching portion 10c, the probe light pulse is caused to branch into the two beams of the branching light, and the two beams of the branching light are fed to the arm 10a and the arm 10b.

The branching light (probe light pulse) fed to the arm 10b transmits through the arm 10b, and reaches the merging portion 10d.

The branching light (probe light pulse) fed to the arm 10a travels in the arm 10a in the x-axis direction.

The terahertz light pulses, which are subject to detection by the electromagnetic wave detection device 1, are made incident vertically to the electromagnetic wave input surface 16a. On this occasion, the angle between the travel direction of the terahertz light pulses and the travel direction of the branching light (probe light pulse) is θ$_{clad}$. The terahertz light pulses travel straight in the prism 16, and reach the electromagnetic wave transmission surface 16b. The terahertz light pulses refract on the electromagnetic wave transmission surface 16b. On this occasion, the angle between the travel direction of the terahertz light pulses and the travel direction of the branching light (probe light pulse) becomes θ, and the terahertz light pulses are fed to the arm 10a.

The terahertz light pulses fed to the arm 10a and the branching light (probe light pulse) traveling in the x-axis direction in the arm 10a generate the Cherenkov phase matching. As a result, phase modulation is generated in the branching light (probe light pulse) traveling in the x-axis direction in the arm 10a. The branching light (probe light pulse), which has been phase-modulated, transmits through the arm 10a, and reaches the merging portion 10d.

The two beams of the branching light from the two arms 10a and 10b merge at the merging portion 10d. The light intensity of the branching light which have merged is measured by the PD 20.

The phase of the branching light (probe light pulse) changes in the arm 10a according to an electric field intensity of the terahertz light pulses. On the other hand, the phase of the branching light (probe light pulse) is constant in the arm 10b. Moreover, the light intensity of the output from the merging portion 10d changes according to the phase difference between the branching light which has transmitted through the arm 10a and the branching light which has transmitted through the arm 10b. Thus, the phase difference between the branching light, which has transmitted through the arm 10a, and the branching light, which has transmitted through the arm 10b, can be measured by the PD 20 measuring a quantity of change in the light intensity of the output of the merging portion 10d, and, moreover, the electric field intensity of the terahertz light pulse can be measured. As a result, the change in the light intensity of the terahertz light pulses can be measured by means of sampling, and the terahertz light pulses can be detected.

According to the first embodiment of the present invention, in the electromagnetic wave detection device 1, which is the detection device for the terahertz waves by means of the EO (electro-optic) sampling using the optical waveguide 10, which is the electro-optic crystal, it is not necessary to reflect the probe light pulse, which has transmitted through the arm 10a, back to the arm 10a, and the configuration of the electromagnetic wave detection device 1 can thus be simplified.

Second Embodiment

The electromagnetic wave detection device 1 according to a second embodiment is different from the electromagnetic wave detection device 1 according to the first embodiment in a point that a metal membrane 15 is provided between the electromagnetic wave transmission surface 16b and the arm 10b.

Figure 2:
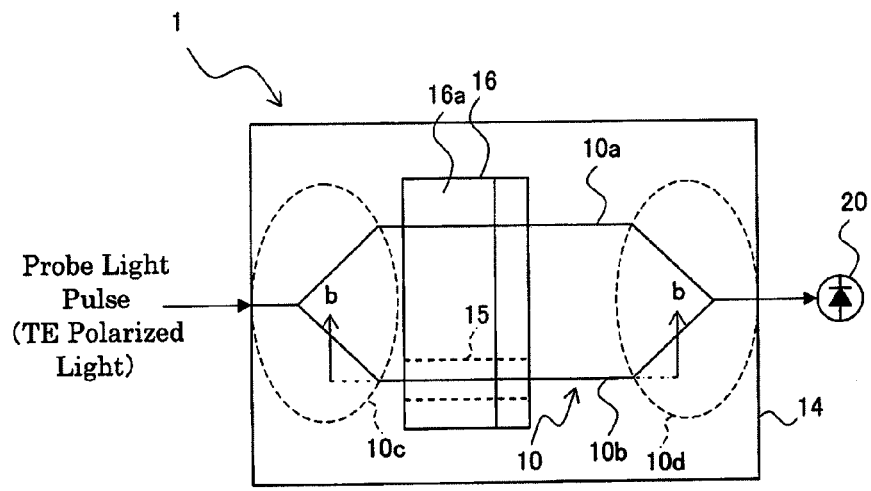
FIG. 2 includes a plan view of the electromagnetic wave detection device 1 according to the second embodiment of the present invention (FIG. 2(a)), and a cross sectional view (cross section made on a plane indicated by b) of the prism 16, the arm 10a, and the substrate 14 made on the arm 10b (FIG. 2(b))
Figure 2:
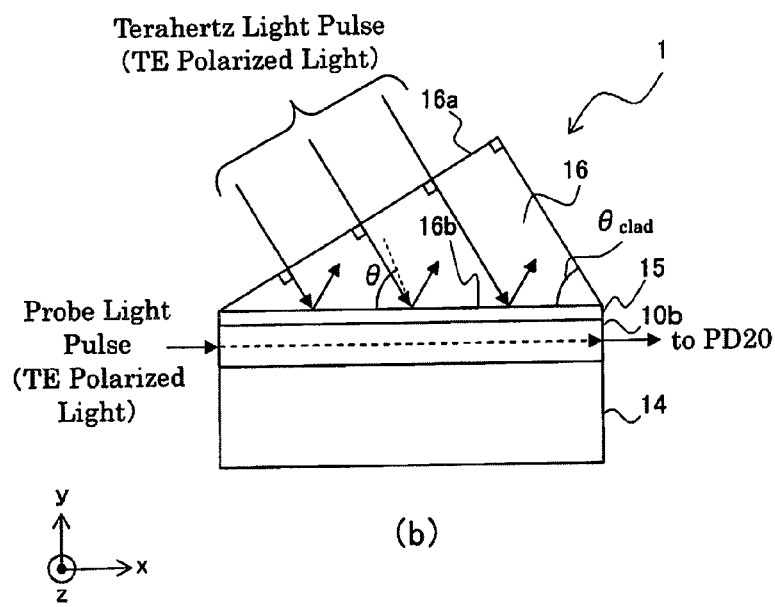

FIG. 2 includes a plan view of the electromagnetic wave detection device 1 according to the second embodiment of the present invention (FIG. 2(a)), and a cross sectional view (cross section made on a plane indicated by b) of the prism 16, the arm 10a, and the substrate 14 made on the arm 10b (FIG. 2(b)). It should be noted that portions of the arm 10b and the substrate 14 which are not directly below the prism 16 are not shown in FIG. 2(b).

The electromagnetic wave detection device 1 according to the second embodiment includes the optical waveguide 10, the substrate 14, the metal membrane (electromagnetic wave shield layer) 15, the prism (electromagnetic wave input unit) 16, and the PD (Photo Detector) (phase difference measurement unit) 20. In the following section, the same components are denoted by the same numerals as of the first embodiment, and will be described in no more details.

The optical waveguide 10, the substrate 14, and the PD 20 are the same as those in the first embodiment, and a description thereof, therefore, is omitted.

Though the prism (electromagnetic wave input unit) 16 is approximately the same as that in the first embodiment, the prism 16 is different in the following point. The prism 16 is immediately above the arm 10a and the arm 10b. As a result, the electromagnetic wave transmission surface 16b covers one branching light transmission portion (arm 10a), and also covers the other branching light transmission portion (arm 10b).

Referring to FIG. 2(b), the metal membrane (electromagnetic wave shield layer) 15 is disposed between the electromagnetic wave transmission surface 16b and the arm 10b (the other branching light transmission portion). The metal membrane 15 does not permit the terahertz wave to transmit, but reflects the terahertz wave.

A description will now be given of an operation of the second embodiment of the present invention.

First, when the probe light pulse is fed to the branching portion 10c, the probe light pulse is caused to branch into the two beams of the branching light, and the two beams of the branching light are fed to the arm 10a and the arm 10b.

The branching light (probe light pulse) fed to the arm 10b transmits through the arm 10b, and reaches the merging portion 10d. On this occasion, the terahertz waves made incident to the prism 16 contain a component which travels straight toward the arm 10b in the prism 16. However, this component is reflected by the metal membrane 15, and is not fed to the arm 10b. Thus, the phase of the branching light (probe light pulse) is constant in the arm 10b.

The other operations are the same as those in the first embodiment, and a description thereof, therefore, is omitted.

According to the second embodiment of the present invention, the same effects as those in the first embodiment are provided.

Third Embodiment

The electromagnetic wave detection device 1 according to a third embodiment is different from the electromagnetic wave detection device 1 according to the first embodiment in a point that a metal membrane 17 is provided on a portion covering the other branching light transmission portion (arm 10b) of the electromagnetic wave input surface 16a.

Figure 3:
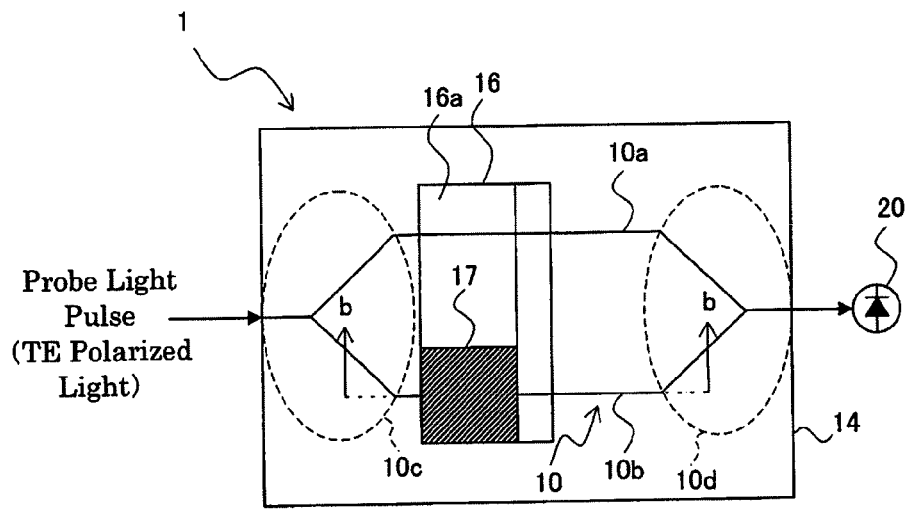
FIG. 3 includes a plan view of the electromagnetic wave detection device 1 according to the third embodiment of the present invention (FIG. 3(a)), and a cross sectional view (cross section made on a plane indicated by b) of the prism 16, the arm 10a, and the substrate 14 made on the arm 10b (FIG. 3(b))
Figure 3:
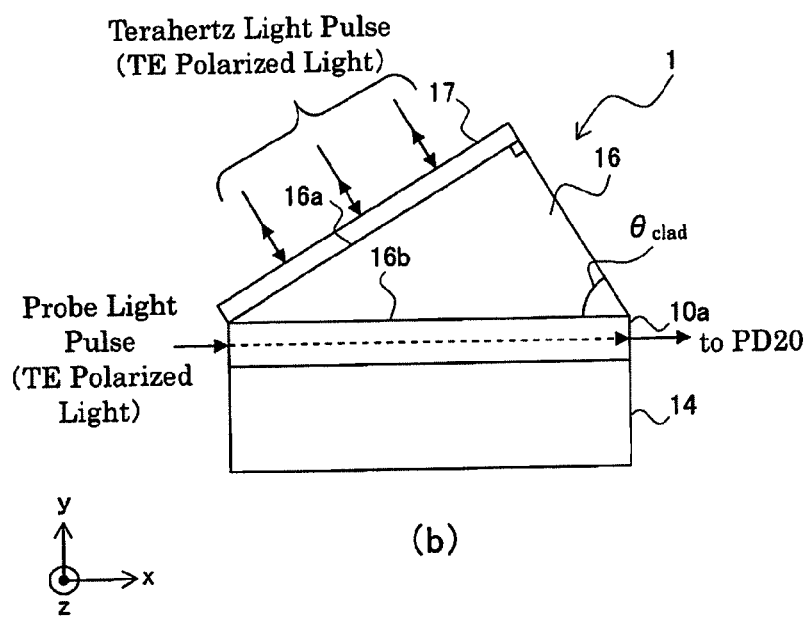

FIG. 3 includes a plan view of the electromagnetic wave detection device 1 according to the third embodiment of the present invention (FIG. 3(a)), and a cross sectional view (cross section made on a plane indicated by b) of the prism 16, the arm 10a, and the substrate 14 made on the arm 10b (FIG. 3(b)). It should be noted that portions of the arm 10b and the substrate 14 which are not directly below the prism 16 are not shown in FIG. 3(b).

The electromagnetic wave detection device 1 according to the third embodiment includes the optical waveguide 10, the substrate 14, the prism (electromagnetic wave input unit) 16, the metal membrane (electromagnetic wave shield layer) 17, and the PD (Photo Detector) (phase difference measurement unit) 20. In the following section, the same components are denoted by the same numerals as of the first embodiment, and will be described in no more details.

The optical waveguide 10, the substrate 14, and the PD 20 are the same as those in the first embodiment, and a description thereof, therefore, is omitted.

Though the prism (electromagnetic wave input unit) 16 is approximately the same as that in the first embodiment, the prism 16 is different in the following point. The prism 16 is immediately above the arm 10a and the arm 10b. As a result, the electromagnetic wave transmission surface 16b covers the one branching light transmission portion (arm 10a), and also covers the other branching light transmission portion (arm 10b).

Referring to FIG. 3(b), the metal membrane (electromagnetic wave shield layer) 17 is placed on a portion covering the other branching light transmission portion (arm 10b) out of the electromagnetic wave input surface 16a. The metal membrane 17 does not permit the terahertz wave to transmit, but reflects the terahertz wave.

A description will now be given of an operation of the third embodiment of the present invention.

First, when the probe light pulse is fed to the branching portion 10c, the probe light pulse is caused to branch into the two beams of the branching light, and the two beams of the branching light are fed to the arm 10a and the arm 10b.

The branching light (probe light pulse) fed to the arm 10b transmits through the arm 10b, and reaches the merging portion 10d. On this occasion, the terahertz waves made incident to the prism 16 contain a component which travels straight toward the arm 10b. However, this component is reflected by the metal membrane 17, does not transmit through the prism 16, and is not fed to the arm 10b. Thus, the phase of the branching light (probe light pulse) is constant in the arm 10b.

The other operations are the same as those in the first embodiment, and a description thereof, therefore, is omitted.

According to the third embodiment of the present invention, the same effects as those in the first embodiment are provided.

Fourth Embodiment

The electromagnetic wave detection device 1 according to a fourth embodiment is different from the electromagnetic wave detection device 1 according to the first embodiment in a point that a DC voltage is impressed on the arm 10a or the arm 10b.

Figure 4:
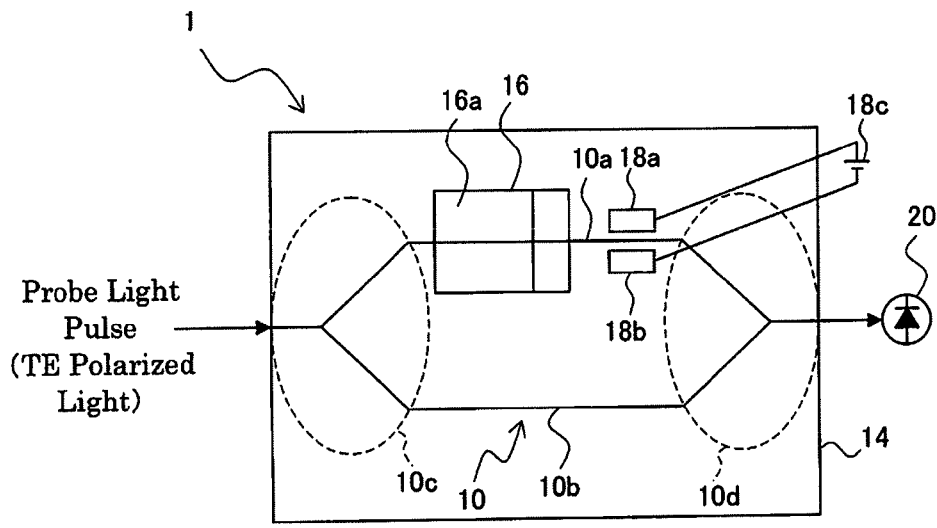
FIG. 4 includes a plan view of the electromagnetic wave detection device 1 according to the fourth embodiment of the present invention when the DC voltage is impressed on the arm 10a (FIG. 4(a)), and a plan view of the electromagnetic wave detection device 1 when the DC voltage is impressed on the arm 10b (FIG. 4(b))
Figure 4:
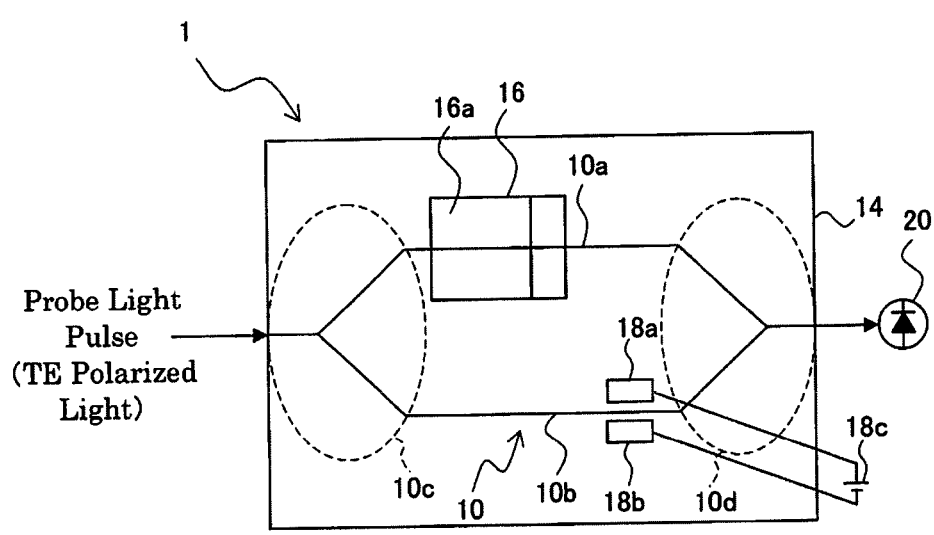

FIG. 4 includes a plan view of the electromagnetic wave detection device 1 according to the fourth embodiment of the present invention when the DC voltage is impressed on the arm 10a (FIG. 4(a)), and a plan view of the electromagnetic wave detection device 1 when the DC voltage is impressed on the arm 10b (FIG. 4(b)).

The electromagnetic wave detection device 1 according to the fourth embodiment includes the optical waveguide 10, the substrate 14, the prism (electromagnetic wave input unit) 16, an electrode 18a, an electrode 18b, a DC power supply 18c, and the PD (Photo Detector) (phase difference measurement unit) 20. In the following section, the same components are denoted by the same numerals as of the first embodiment, and will be described in no more details.

The optical waveguide 10, the substrate 14, the prism 16, and the PD 20 are the same as those in the first embodiment, and a description thereof, therefore, is omitted.

Referring to FIG. 4(a), when the DC voltage is impressed on the arm 10a, the electrode 18a and the electrode 18b placed on the substrate 14 are arranged on both sides of the arm 10a. The DC power supply 18c is connected to the electrode 18a and the electrode 18b.

Referring to FIG. 4(b), when the DC voltage is impressed on the arm 10b, the electrode 18a and the electrode 18b placed on the substrate 14 are arranged on both sides of the arm 10b. The DC power supply 18c is connected to the electrode 18a and the electrode 18b.

The substrate 14 and the optical waveguide 10 form a Mach-Zehnder type modulator. On this occasion, an operation point of the Mach-Zehnder type modulator can be adjusted by impressing the DC voltage on the arm 10a or the arm 10b, and the Mach-Zehnder type modulator can be operated at an operation point high in sensitivity.

It should be noted that the DC voltage can be impressed on the arm 10a or the arm 10b in the electromagnetic wave detection devices 1 according to the second embodiment and the third embodiment as shown in FIG. 4.

Fifth Embodiment

The electromagnetic wave detection device 1 according to the fifth embodiment is different from the electromagnetic wave detection device 1 according to the first embodiment in a point that a directional coupler 10e or an MMI coupler 10f is used in place of the merging portion 10d.

Figure 5:
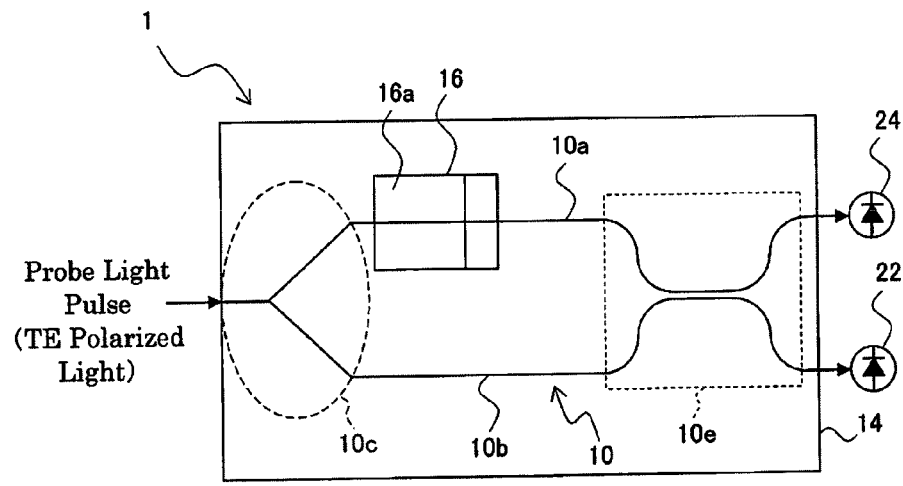
FIG. 5 includes plan views of the electromagnetic wave detection device 1 according to the fifth embodiment of the present invention, which are an example when the directional coupler 10e is used (FIG. 5(a)), and an example when the MMI coupler 10f is used (FIG. 5(b))
Figure 5:
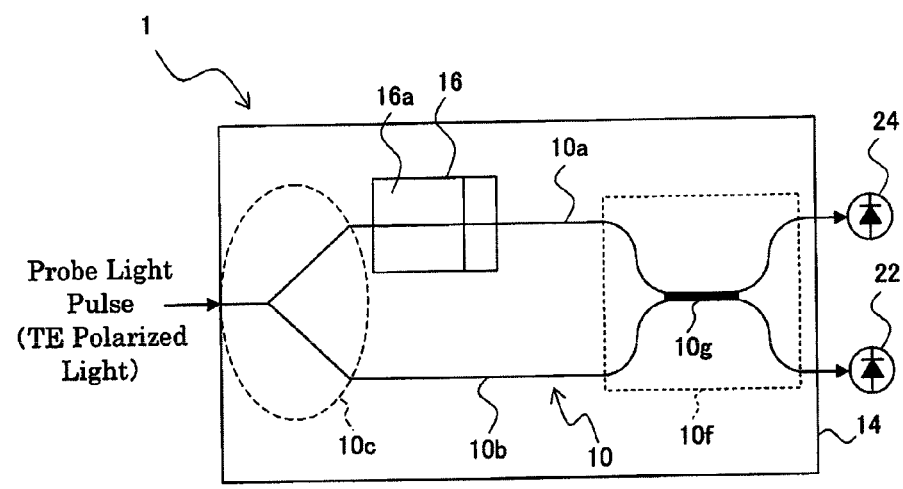

FIG. 5 includes plan views of the electromagnetic wave detection device 1 according to the fifth embodiment of the present invention, which are an example when the directional coupler 10e is used (FIG. 5(a)), and an example when the MMI coupler 10f is used (FIG. 5(b)).

The electromagnetic wave detection device 1 according to the fifth embodiment includes the optical waveguide 10, the substrate 14, the prism (electromagnetic wave input unit) 16, a first PD (Photo Detector) 22, and a second PD (Photo Detector) 24. In the following section, the same components are denoted by the same numerals as of the first embodiment, and will be described in no more details.

The substrate 14 and the prism 16 are the same as those in the first embodiment, and a description thereof, therefore, is omitted.

The optical waveguide 10 includes the branching portion 10c, the arms (branching light transmission portions) 10a and 10b, and the directional coupler 10e or the MMI (Multi-Mode Interference) coupler 10f. The branching portion 10c and the arms (branching light transmission portions) 10a and 10b are the same as those in the first embodiment, and a description thereof, therefore, is omitted.

Referring to FIG. 5(a), the directional coupler 10e receives the beams of the branching light from the two arms (branching light transmission portions) 10a and 10b, mode-couples the beams of the branching light, further causes the coupled light to branch into two beams of output light, and outputs the two beams of the output light to the first PD 22 and the second PD 24. It should be noted that a length of an optical waveguide connecting the arm 10a and the second PD 24 to each other, and a length of an optical waveguide connecting the arm 10b and the first PD 22 to each other are equal. Moreover, the two optical waveguides which receive the branching light and are equal in length need to be placed close to each other in order to mode-couple the beams of the branching light.

Referring to FIG. 5(b), the MMI coupler 10f receives the beams of the branching light from the two arms (branching light transmission portions) 10a and 10b, couples the two beams of the branching light (causes the two beams to multi-mode interfere with each other), further causes the coupled light to branch into two beams of output light, and outputs the two beams of the output light to the first PD 22 and the second PD 24. It should be noted that a length of an optical waveguide connecting the arm 10a and the second PD 24 to each other, and a length of an optical waveguide connecting the arm 10b and the first PD 22 to each other are equal. Moreover, the two beams of the branching light need to be fed to a wide waveguide portion 10g in order to cause the two beams of the branching light to multi-mode interfere with each other.

The first PD (Photo Detector) 22 measures a light intensity of the output light output on the lower side (arm 10b side) of the directional coupler 10e or the MMI coupler 10f. The second PD (Photo Detector) 24 measures a light intensity of the output light output on the upper side (arm 10a side) of the directional coupler 10e or the MMI coupler 10f.

When the terahertz waves are not fed to the electromagnetic wave detection device 1, the phase difference between the branching light in the arm 10a and the branching light in the arm 10b is zero, and while the output light is output to the first PD 22, the output light is not output to the second PD 24.

Moreover, when the terahertz waves are fed to the electromagnetic wave detection device 1, and the optical path length of the arm 10a becomes different from the optical path length of the arm 10b, the output light is output to the second PD 24 according to the difference.

For example, when the terahertz waves are fed to the electromagnetic wave detection device 1, and the optical path length of the arm 10*a* is set longer than the optical path length of the arm 10*b* by a half wavelength of the probe light pulse, the phase difference between the branching light in the arm 10*a* and the branching light in the arm 10*b* is it [rad], and while the output light is output to the second PD 24, the output light is not output to the first PD 22.

In this way, when the terahertz waves are fed to the electromagnetic wave detection device 1, the light intensity of the output light measured by the first PD 22 and the light intensity of the output light measured by the second PD 24 change according to the phase difference between the branching light in the arm 10*a* and the branching light in the arm 10*b*. As a result, the measurement of the light intensities of the two beams of the output light leads to measurement of the phase difference between the two beams of the branching light.

A description will now be given of an operation of the fifth embodiment of the present invention.

First, when the probe light pulse is fed to the branching portion 10*c*, the probe light pulse is caused to branch into the two beams of the branching light, and the two beams of the branching light are fed to the arm 10*a* and the arm 10*b*.

Actions of the branching light in the arm 10*a* and the arm 10*b* are the same as those in the first embodiment, and a description thereof, therefore, is omitted.

The two beams of the branching light which have transmitted through the arm 10*a* and the arm 10*b* are coupled by the directional coupler 10*e* (refer to FIG. 5(*a*)) or the MMI coupler 10*f* (refer to FIG. 5(*b*)), the coupled light is then further caused to branch into the two beams of the output light, and the two beams of the output light are fed to the first PD 22 and the second PD 24. The first PD 22 and the second PD 24 measure the light intensities of the output light of the directional coupler 10*e* or the MMI coupler 10*f*.

The phase of the branching light (probe light pulse) changes in the arm 10*a* according to an electric field intensity of the terahertz light pulses. On the other hand, the phase of the branching light (probe light pulse) is constant in the arm 10*b*. Moreover, the light intensity of the output light measured by the first PD 22 and the light intensity of the output light measured by the second PD 24 change according to the phase difference between the branching light which has transmitted through the arm 10*a* and the branching light which has transmitted through the arm 10*b*. Thus, the phase difference between the branching light, which has transmitted through the arm 10*a*, and the branching light, which has transmitted through the arm 10*b*, can be measured by measuring the light intensities of both of the two beams of the output light, and, moreover, the electric field intensity of the terahertz light pulse can be measured. As a result, the change in the light intensity of the terahertz light pulses can be measured by means of sampling, and the terahertz light pulses can be detected.

According to the fifth embodiment of the present invention, the same effects as those in the first embodiment are provided. Moreover, noise (common mode noise component) common to the case in which the probe light pulse transmits through the arm 10*a* and the case in which the probe light pulse transmits through the arm 10*b* can be canceled, and detection at higher sensitivity of the terahertz light pulse can be enabled.

Also in the electromagnetic wave detection devices 1 according to the second embodiment and the third embodiment, as in FIG. 5, the directional coupler 10*e* (or the MMI coupler 10*f*), the first PD 22, and the second PD 24 may be provided, and the phase difference between the two beams of the branching light which have transmitted through the two branching light transmission portions (arms 10*a* and 10*b*) may be measured.

Sixth Embodiment

The electromagnetic wave detection device 1 according to a sixth embodiment is different from the electromagnetic wave detection device 1 according to the fifth embodiment (refer to FIG. 5(*a*)) in a point that a directional coupler 10*h* is used in place of the branching portion 10*c*.

Figure 6:
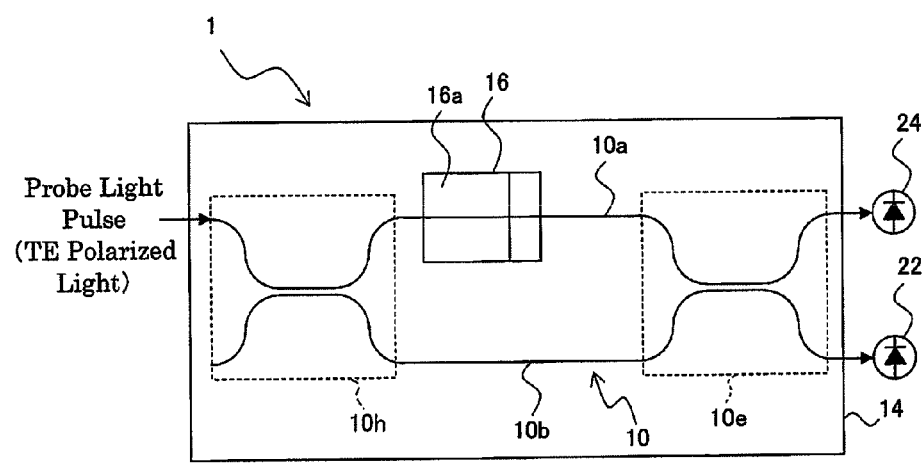
FIG. 6 is a plan view of the electromagnetic wave detection device 1 according to the sixth embodiment of the present invention.

FIG. 6 is a plan view of the electromagnetic wave detection device 1 according to the sixth embodiment of the present invention. The electromagnetic wave detection device 1 according to the sixth embodiment includes the optical waveguide 10, the substrate 14, the prism (electromagnetic wave input unit) 16, the first PD (Photo Detector) 22, and the second PD (Photo Detector) 24. In the following section, the same components are denoted by the same numerals as of the fifth embodiment, and will be described in no more details.

The substrate 14 and the prism 16 are the same as those in the fifth embodiment, and a description thereof, therefore, is omitted.

The optical waveguide 10 includes the directional coupler 10*h*, the arms (branching light transmission portions) 10*a* and 10*b*, and the directional coupler 10*e*. The arms (branching light transmission portions) 10*a* and 10*b* and the directional coupler 10*e* are the same as those in the fifth embodiment, and a description thereof, therefore, is omitted.

The directional coupler 10*h* is a two-input, two-output type directional coupler. The directional coupler 10*h* receives the probe light pulse (TE polarized light) on one input, and receives none on the other input. The directional coupler 10*h* causes the probe light pulse (TE polarized light) to branch into two beams of branching light. The two beams of the branching light are respectively fed to the arm 10*a* and the arm 10*b*.

It should be noted that the branch ratio of the output between the directional coupler 10*h* and the directional coupler 10*e* is 1:1, for example.

The first PD 22 and the second PD 24 are the same as those in the fifth embodiment, and a description thereof, therefore, is omitted.

A description will now be given of an operation of the sixth embodiment of the present invention.

First, when the probe light pulse is fed to the directional coupler 10*h*, the probe light pulse branches into the two beams of the branching light, and the two beams of the branching light are fed to the arm 10*a* and the arm 10*b*.

Actions of the branching light in the arm 10*a* and the arm 10*b* are the same as those in the fifth embodiment, and a description thereof, therefore, is omitted.

The actions of the directional coupler 10*e*, the first PD 22, and the second PD 24 are the same as those in the fifth embodiment, and a description thereof, therefore, is omitted.

According to the sixth embodiment of the present invention, the same effects as those in the fifth embodiment are provided. It should be noted that the MMI coupler 10*f* (refer to FIG. 5(*b*)) may be used in place of the directional coupler 10*e*.

Also in the electromagnetic wave detection devices 1 according to the second embodiment and the third embodiment, as in FIG. 6, the directional coupler 10*h*, the directional coupler 10*e* (or the MMI coupler 10*f*), the first PD 22, and the second PD 24 may be provided, and the phase difference between the two beams of the branching light which have transmitted through the two branching light transmission portions (arms 10*a* and 10*b*) may be measured.

Seventh Embodiment

While the electromagnetic wave detection device 1 includes the Mach-Zehnder type modulator in the previous embodiments, the electromagnetic wave detection device 1 according to the seventh embodiment does not include a Mach-Zehnder type modulator.

Figure 7:
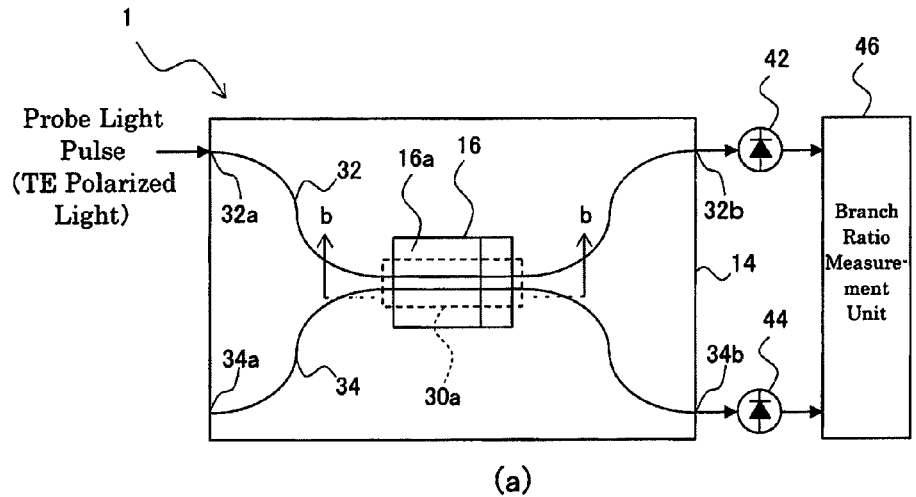
FIG. 7 includes a plan view of the electromagnetic wave detection device 1 according to the seventh embodiment of the present invention (FIG. 7(a)), and a cross sectional view (cross section made on a plane indicated by b) of the prism 16, a close portion 30a, and the substrate 14 (FIG. 7(b)).
Figure 7:
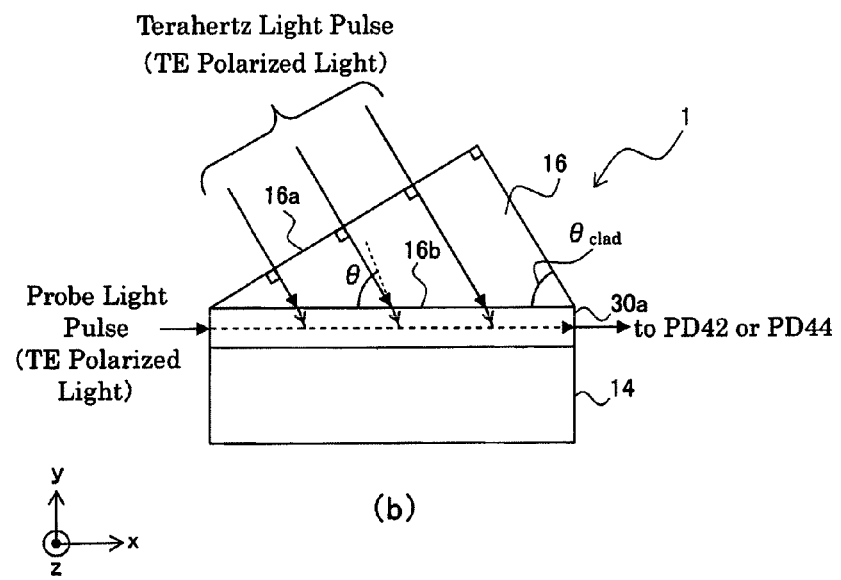

FIG. 7 includes a plan view of the electromagnetic wave detection device 1 according to the seventh embodiment of the present invention (FIG. 7(a)), and a cross sectional view (cross section made on a plane indicated by b) of the prism 16, a close portion 30a, and the substrate 14 (FIG. 7(b)). It should be noted that in portions of the close portion 30a and the substrate 14 which are not directly below the prism 16 are not shown in FIG. 7(b).

The electromagnetic wave detection device 1 according to the seventh embodiment includes a first optical waveguide 32, a second optical waveguide 34, the substrate 14, the prism (electromagnetic wave input unit) 16, the PDs (Photo Detectors) 42 and 44, and a branch ratio measurement unit 46.

The electromagnetic wave detection device 1 detects an electromagnetic wave having a frequency equal to or more than 0.01 [THz] and equal to or less than 100 [THz]. The electromagnetic wave detected by the electromagnetic wave detection device 1 is an electromagnetic wave (terahertz wave) in the terahertz waveband (equal to or more than 0.03 [THz] and equal to or less than 10 [THz]), for example.

The first optical waveguide 32 receives the probe light pulse on one end 32a, and is a nonlinear crystal. The second optical waveguide 34 does not receive light on one end 34a, and is a nonlinear crystal. A length of the first optical waveguide 32 and a length of the second optical waveguide 34 are equal to each other. Moreover, the other end 32b of the first optical waveguide 32 is connected to the PD 42. The other end 34b of the second optical waveguide 34 is connected to the PD 44.

A portion at which the first optical waveguide 32 and the second optical waveguide 34 are close to each other is referred to as a close portion 30a. The first optical wave guide 32 and the second optical waveguide 34 are parallel with each other in the close portion 30a, and both of them extend in the x-axis direction.

The light passing through the first optical waveguide 32 and the light passing through the second optical waveguide 34 are mode-coupled in the close portion 30a.

The substrate 14 is a non-doped LiNbO₃ (LN) substrate or an MgO-doped LN substrate. The first optical waveguide 32 and the second optical waveguide 34 are disposed on the substrate 14.

For example, the substrate 14 is a Y-cut LN, and the transmission direction of the probe light pulse in the first optical waveguide 32 and the second optical waveguide 34 in the close portion 30a is set to an x axis. In this way, the probe light pulse polarized in the z-axis direction (TE polarized light) is input. Then, the r33, which presents the maximum electro-optic coefficient in the LN can be used, and a large electro-optic effect is acquired, and sensitive terahertz wave detection is enabled. For the directions of the x axis, the y axis, and the z axis, refer to FIG. 7(b).

The prism (electromagnetic wave input unit) 16 inputs terahertz waves, which is tilted by an angle θ generating Cherenkov phase matching with respect to the travel direction of the light (x direction) passing through the close portion 30a, into the close portion 30a. It should be noted that the angle θ is an angle satisfying the following equation.

$$\cos\theta \approx \frac{n_{opt\_eff}}{n_{THz}}$$

where an effective refractive index of the close portion 30a at the wavelength of the probe light pulse is $n_{opt\_eff}$, and an refractive index of the close portion 30a at the wavelength of the terahertz wave is $n_{THz}$. For example, if $n_{opt\_eff}$=2.2 and $n_{THz}$=5.2, θ=66°.

The prism 16 includes the electromagnetic wave input surface 16a and the electromagnetic wave transmission surface 16b. The electromagnetic wave input surface 16a receives the terahertz waves. The electromagnetic wave transmission surface 16b is a surface through which the terahertz waves which have entered from the electromagnetic wave input surface 16a transmit. The electromagnetic wave input surface 16a is tilted with respective to the electromagnetic wave transmission surface 16b. The angle of the tilt of the electromagnetic wave input surface 16a with respect to the electromagnetic wave transmission surface 16b is an angle (90°−θ$_{clad}$). The terahertz waves fed to the prism 16 are pulses of TE polarized light, and are also referred to as terahertz light pulses (refer to FIG. 7(b)).

It should be noted that the angle θ$_{clad}$ is an angle satisfying the following equation.

$$\cos\theta_{clad} \approx \frac{n_{opt\_eff}}{n_{clad}}$$

where $n_{clad}$ is a refractive index of the prism 16 at the wavelength of the terahertz wave. For example, if $n_{opt\_eff}$=2.2 and $n_{clad}$=3.4, θ$_{clad}$=50°.

Moreover, the prism 16 is disposed immediately above the close portion 30a. Therefore, the electromagnetic wave transmission surface 16b covers both the first optical waveguide 32 and the second optical waveguide 34.

Absorption of the terahertz waves is preferably small in order to reduce a transmission loss of the terahertz waves in the prism 16. A material of the prism 16 is thus high-resistivity silicone or germanium, for example.

The PD (Photo Detector) 42 measures the light intensity of the light output from the other end 32b of the first optical waveguide 32. The PD (Photo Detector) 44 measures the light intensity of the light output from the other end 34b of the second optical waveguide 34. The branch ratio measurement unit 46 measures a ratio between a measurement result by the PD 42 and a measurement result by the PD 44.

A description will now be given of an operation of the seventh embodiment of the present invention.

First, when the probe light pulse is fed to the one end 32a of the first optical waveguide 32, the probe light pulse transmits through the first optical waveguide 32, and reaches the close portion 30a. In the close portion 30a, the mode coupling is generated, and the probe light pulse branches to the first waveguide 32 and the second waveguide 34. A ratio (branch ratio) in intensity between the light branching to the first optical wave guide 32 and the light branching to the second optical waveguide 34 is 1:1, for example, if the terahertz waves are not fed to the electromagnetic wave detection device 1.

The probe light pulse branching to the first waveguide 32 is fed to the PD 42, and the light intensity thereof is measured. The probe light pulse branching to the second waveguide 34 is fed to the PD 44, and the light intensity thereof is measured. The branch ratio measurement unit 46 measures a ratio (namely, the branch ratio) between a measurement result by the PD 42 and a measurement result by the PD 44.

If the terahertz waves are not fed to the electromagnetic wave detection device 1, the measurement result (branch ratio) by the branch ratio measurement unit 46 is 1:1, for example. However, if the terahertz waves are fed to the electromagnetic wave detection device 1, the optical path length of the close portion 30a changes, resulting in a change in branch ratio.

The terahertz light pulses, which are subject to detection by the electromagnetic wave detection device 1, are made incident vertically to the electromagnetic wave input surface 16a. On this occasion, the angle between the travel direction of the terahertz light pulses and the travel direction of the probe light pulse traveling in the close portion 30a is $\theta_{clad}$. The terahertz light pulses travel straight in the prism 16, and reach the electromagnetic wave transmission surface 16b. The terahertz light pulses refract on the electromagnetic wave transmission surface 16b. On this occasion, the angle between the travel direction of the terahertz light pulses and the travel direction of the probe light pulse traveling through the close portion 30a becomes $\theta$, and the terahertz light pulses are fed to the close portion 30a.

The terahertz light pulses fed to the close portion 30a, and the probe light pulse traveling in the x-axis direction in the close portion 30a generate the Cherenkov phase matching. On this occasion, the refraction index of the close portion 30a changes according to the electric field intensity of the terahertz light pulses, resulting in a change in optical path length of the close portion 30a. As a result, the branch ratio changes.

In other words, the change in the optical path length of the close portion 30a can be measured by the branch ratio measurement unit 46 measuring the branch ratio, resulting in measuring the electric field intensity of the terahertz light pulses. As a result, the change in the light intensity of the terahertz light pulses can be measured by means of sampling, and the terahertz light pulses can be detected.

According to the seventh embodiment of the present invention, in the electromagnetic wave detection device 1, which is the detection device for the terahertz waves by means of the EO (electro-optic) sampling using the first optical waveguide 32 and the second optical waveguide 34, which are the electro-optic crystals, it is not necessary to reflect the probe light pulse, which has transmitted through the first optical waveguide 32 and the second optical waveguide 34, back to the first optical waveguide 32 and the second optical waveguide 34, and the configuration of the electromagnetic wave detection device 1 can be simplified.

Moreover, since the prism (electromagnetic wave input unit) 16 inputs the terahertz waves into the first optical waveguide 32 and the second optical waveguide 34, the configuration of the electromagnetic wave detection device 1 can be simplified compared with the configurations for inputting the terahertz waves only into the arm 10a (refer to the first to third embodiments).

The invention claimed is:

1. An electromagnetic wave detection device comprising:
an optical waveguide that is a nonlinear crystal, and includes a branching portion for receiving a probe light pulse, and causing the probe light pulse to branch into two beams of branching light, and two branching light transmission portions for receiving the branching light from the branching portion, and transmitting the branching light;
an electromagnetic wave input unit that inputs an electromagnetic wave having a frequency equal to or more than 0.01 [THz] and equal to or less than 100 [THz] tilted by an angle generating Cherenkov phase matching with respect to a travel direction of the branching light into one of the two branching light transmission portions; and
a phase difference measurement unit that measures a phase difference between the two beams of the branching light that have transmitted through the two branching light transmission portions.

2. The electromagnetic wave detection device according to claim 1, wherein:
the optical waveguide includes a merging portion for receiving the two beams of branching light from the two branching light transmission portions, and merging the two beams of the branching light; and
the phase difference measurement unit measures a light intensity of an output of the merging portion.

3. The electromagnetic wave detection device according to claim 1, wherein:
the optical waveguide includes a coupler for receiving and coupling the two beams of the branching light from the two branching light transmission portions, causing the coupled light to branch into two beams of output light, and outputting the two beams of the output light; and
the phase difference measurement unit measures light intensities of the two beams of the output light.

4. The electromagnetic wave detection device according to claim 3, wherein the coupler is a directional coupler or an MMI coupler.

5. The electromagnetic wave detection device according to claim 1, wherein the branching portion is a two-input, two-output type directional coupler.

6. The electromagnetic wave detection device according to claim 1, wherein:
the electromagnetic wave input unit includes an electromagnetic wave input surface for receiving the electromagnetic wave, and an electromagnetic wave transmission surface through which the electromagnetic wave which has entered from the electromagnetic wave input surface transmits; and
the electromagnetic wave input surface is tilted with respect to the electromagnetic wave transmission surface.

7. The electromagnetic wave detection device according to claim 6, wherein the electromagnetic wave transmission surface covers one of the branching light transmission portions, and does not cover the other one of the branching light transmission portions.

8. The electromagnetic wave detection device according to claim 6, wherein the electromagnetic wave transmission surface covers the two branching light transmission portions, and has an electromagnetic wave shield layer which does not transmit the electromagnetic wave between the electromagnetic wave transmission surface and the other branching light transmission portion.

9. The electromagnetic wave detection device according to claim 6, wherein the electromagnetic wave transmission surface covers the two branching light transmission portions, and has an electromagnetic wave shield layer which does not transmit the electromagnetic wave at a portion of the electromagnetic wave input surface covering the other branching light transmission portion.

10. The electromagnetic wave detection device according to claim 1, wherein a DC voltage is impressed upon either one of the two branching light transmission portions.

11. The electromagnetic wave detection device according to claim 1, wherein the probe light pulse and the electromagnetic wave are TE polarized light.

12. An electromagnetic wave detection device comprising:
a first optical waveguide that is a nonlinear crystal, and receives a probe light pulse on one end;
a second optical waveguide that is a nonlinear crystal, and does not receive light on one end;
an electromagnetic wave input unit that inputs an electromagnetic wave having a frequency equal to or more than 0.01 [THz] and equal to or less than 100 [THz] tilted by an angle generating Cherenkov phase matching with respect to a travel direction of light passing through a close portion at which the first optical waveguide and the second optical waveguide are close to each other into the close portion; and a branch ratio measurement unit that measures a ratio between a light intensity of light output from the other end of the first waveguide and a light intensity of light output from the other end of the second waveguide, wherein the light passing through the first optical waveguide and the light passing through the second optical waveguide are mode-coupled in the close portion.

13. The electromagnetic wave detection device according to claim 12, wherein:

the electromagnetic wave input unit includes an electromagnetic wave input surface for receiving the electromagnetic wave, and an electromagnetic wave transmission surface through which the electromagnetic wave which has entered from the electromagnetic wave input surface transmits; and the electromagnetic wave input surface is tilted with respect to the electromagnetic wave transmission surface.

14. The electromagnetic wave detection device according to claim 13, wherein the electromagnetic wave transmission surface covers both the first optical waveguide and the second optical waveguide.

15. The electromagnetic wave detection device according to claim 12, wherein the probe light pulse and the electromagnetic wave are TE polarized light.

* * * * *